United States Patent [19]

Inoue et al.

[11] Patent Number: 5,673,136
[45] Date of Patent: Sep. 30, 1997

[54] OPTICAL SCANNER

[75] Inventors: Nozomu Inoue; Takashi Hama; Yujiro Nomura; Kyu Takada, all of Nagano, Japan

[73] Assignee: Seiko Epson Corporation, Tokyo, Japan

[21] Appl. No.: 604,901

[22] Filed: Feb. 22, 1996

[30] Foreign Application Priority Data

Feb. 23, 1995 [JP] Japan .................... 7-059894

[51] Int. Cl.⁶ .................................. G02B 26/08
[52] U.S. Cl. .................. 359/205; 359/206; 359/212; 359/216
[58] Field of Search ........................ 359/196–226, 359/819, 820, 823; 347/256–261

[56] References Cited

U.S. PATENT DOCUMENTS 4,815,059  3/1989  Nakayama et al. ............ 359/820
5,155,616  10/1992  Yamaguchi et al. ............ 359/209

FOREIGN PATENT DOCUMENTS

0415236A2  3/1991  European Pat. Off. ......... B41J 2/435

*Primary Examiner*—James Phan
*Attorney, Agent, or Firm*—Sughrue, Mion, Zinn, Macpeak & Seas

[57] ABSTRACT

An optical scanner that has a simple construction and which yet exhibits satisfactory imaging performance under varying temperature conditions. Of the two orthogonal scanning cross sections of scanning optics (i.e., the main and sub-scanning cross sections), the one that involves the greater movement of the image plane due to the temperature-dependent changes in optical characteristics (e.g. the variation in the operating wavelength of a light source, the index variation of a lens material and the thermal expansion of a lens itself) is adapted to be the same as the other cross section that involves the greater movement of the image plane due to the change in the distance from the light source to a collimator lens. If necessary, additional correction is effected in such a way that the scanning cross section that involves the greater overall movement of the image plane after correction for temperature changes is adapted to be different from the cross section that involves the greater amount of optical field curvature.

5 Claims, 5 Drawing Sheets

---- MAIN SCANNING CROSS SECTION
——— SUB-SCANNING CROSS SECTION

--- MAIN SCANNING CROSS SECTION
— SUB-SCANNING CROSS SECTION

OPTICAL SCANNER

BACKGROUND OF THE INVENTION

The present invention relates to an optical scanner for use with a laser beam printer and other optical image forming apparatus. More specifically, the invention relates to a method of compensating or the deterioration in optical characteristics due to temperature variations.

Prior Art

A prior art optical scanner is shown schematically in FIG. 10. A laser beam, or rays of light issuing from a semiconductor laser 211, is collimated to parallel light by means of a collimator lens 221 and shaped to a convergent beam by means of a cylindrical lens 222. The convergent beam is convergent in one of the cross sections which are orthogonal to each other and include the optical axes of collimator lens 221. The shaped beam is deflected by a rotating polygonal mirror 230. The deflected beam is passed through scanning lenses 251 to be focused as a spot on the surface to be scanned 240. The image point is substantially equal to the beam waist of a Gaussian beam. To insure that the beam is focused to form a planar image on the surface 240, the scanning lenses 251 is designed such that it will not produce astigmatism or curvature of the field in greater amounts than specified values. In addition, the scanning lenses 251 is designed to create negative distortion so that the beam deflected from the rotating polygonal mirror 230 at uniform angular velocity will scan the surface 240 at uniform linear velocity.

If a ray of light incident on the scanning lens 251 at a viewing angle of $\theta$ is transformed to form an image in such a way that the height of the image y is proportional to $\theta$, the relationship expressed by $y=f\cdot\theta$ will hold, where f is the focal length of the lens 251. A lens satisfying this relationship is commonly referred to as an "f$\theta$ lens".

The convergent beam from the cylindrical lens 222 forms a line image on a deflecting surface of the rotating polygonal mirror 230 in a direction parallel to the scanning direction. The line image will eventually provide a spot of a specified size on the surface 240. Hence, a sub-scanning cross section of the optics under consideration is such that each of the deflecting surfaces of the rotating polygonal mirror 230 is optically conjugated with the surface 240. This means that even if the deflecting surfaces of the polygonal mirror 230 are not uniformly parallel to the axis of rotation such that the angle of the deflected beam fluctuates with a specific deflecting surface in the sub-scanning direction, the conjugated relationship is maintained and successive beam spots are formed at the same position on the surface 240 in the sub-scanning direction. Optics of this type is commonly called "tilt-correcting optics" on account of its ability to correct the tilting of deflecting faces of the rotating polygonal mirror 230. Wherein the term "main scanning direction" means the direction which is swept by the light beam which is deflected by the rotating polygonal mirror and the term "sub-scanning direction" means the direction which is perpendicular to the main scanning direction and the optical axis of lenses.

In order to insure that the line image on a deflecting surface produces a circular or elliptical spot of a specified size on the surface 240, the scanning lenses 251 must have different optical characteristics in the main and sub-scanning directions. Optics of this type are commonly called "anamorphic optics".

In most of the conventional optical scanners, the scanning lenses 251 has totally been composed of glass lens elements in order to assure exact precision. However, the use of injection-molded plastic lens elements is increasing today because of the great latitude in shape that is offered by injection molding and for economic reasons. If toric surfaces are to be used in constructing "anamorphic" optics and, particularly in the case of providing them from aspheric (or non-arcuate) rather than arcuate crosssectional shapes, fabrication of the desired lens elements at a practically feasible cost by working on glass is very difficult and can only be commercialized by the use of plastic materials.

One of the major applications of optical scanners is on laser beam printers and efforts are constantly being made to provide better resolution. To this end, the size of the beam spot to be formed on the surface 240 must accordingly be reduced. Therefore, the first requirement to be met is to design optics having high imaging performance; in addition, it is necessary to assemble an optical scanner with the positions and other features of respective lenses being precisely adjusted such that a light beam is properly focused on the surface to be scanned in both a main and a sub-scanning cross section.

Another problem with such high-resolution optics is that even if they have initially the intended imaging performance, the position in which the light beam is focused to form an image will shift axially on account of environmental variations, such as temperature changes and this "defocusing" phenomenon may occasionally deteriorate the imaging performance of the optics. This problem has heretofore been addressed by the proposal of various correcting or compensating mechanisms.

Problems to be Solved by the Invention:

However, the proposals made so far have not been completely satisfactory in preventing the deterioration of imaging performance due to environmental variations, particularly temperature changes. The problems involved in the respective prior art techniques will now be described with reference to the patent literature.

Unexamined Published Japanese Patent Application (kokai) Sho 55-43577 teaches a technique in which optical parts around the collimator lens are designed to have appropriate linear expansion coefficients such that the temperature-dependent variations in the distance from the collimator lens to the semiconductor laser are reduced to within the depth of focus of the collimator lens, thereby ensuring against temperature-dependent variations in the characteristics of the beam issuing from the collimator lens. The thermal expansion of the optical parts around the collimator lens is considered by this technique but it does not take into account other factors such as the changes in refractive index due to wavelength variations in the light source and the dispersion of the lenses used, the refractive index variations with the constituent material of the lenses and the thermal expansion of the lenses. In actual optics, temperature can also affect these factors, thereby causing an image to be formed at a point distant from the surface to be scanned.

If the numerical aperture of the collimator lens is small, the depth of focus is large enough (e.g., several tens of micrometers) to present no significant problems even if the thermal expansion coefficients of optical parts around the collimator lens are not selected with particular care. In practice, however, any variation in the distance from the light source to the collimator lens is amplified by the longitudinal magnification of the overall optics placed between the light source and the surface to be scanned and the position of image formation will depart greatly from the intended image plane. In addition, the primary objective of the technique is to insure that the light beam emerging from interchangeable laser units will have constant characteristics and it does not intend to compensate for the temperature-dependent changes in the imaging performance of the scanning optics by causing deliberate temperature-dependent changes in the properties of the light beam issuing from the collimator lens, as will be described later in this specification.

Unexamined Published Japanese Patent Application (kokai) Sho 63-7530 teaches a technique that addresses the problem of temperature-dependent variations in the operating wavelength of a semiconductor laser which was not considered by the invention described in Unexamined Published Japanese Patent Application (kokai) Sho 55-43577, supra. The technique consists of providing the collimator lens with specified chromatic aberrations by utilizing the dispersion of glass such that any variation in the focal length of the collimator lens that will experience index variations due to the introduced chromatic aberrations can be canceled by the thermal expansion of the optical parts that couple the collimator lens of the semiconductor laser. However, this proposal also fails to take into account the temperature-dependent variations in the refractive index of the lens and its thermal expansion.

This technique parallels the invention described in Unexamined Published Japanese Patent Application (kokai) Sho 55-43557 in that the primary objective is to ensure that the light beam issuing from the collimator lens will maintain a constant (say, parallel) state irrespective of temperature. However, in order to compensate for the temperature-dependent variations in the characteristics of lenses other than the collimator lens, the state (in particular, the angle of divergence) of the beam issuing from the collimator lens is desirably varied with temperature. This is particularly true in the case where the scanning lens is made of a plastic material. Since plastic materials will experience temperature-dependent variations in refractive index that are about ten times as great as the index variation in glass, it is very difficult to compensate for such great variations by lenses other than the collimator lens if the beam issuing from the latter is held in a constant state irrespective of temperature.

A method for correcting the temperature-dependent variation in the refractive index of a plastic lens by utilizing certain parameters is described in Unexamined Published Japanese Patent Application (kokai) Hei 3-163411. According to the method, the scanning lens is made of a plastic material and the temperature-dependent variation of its refractive index and the variation of its focal length due to its own thermal expansion are subjected to optimal correction by taking into consideration the change in the distance from the semiconductor laser to the collimator lens, as well as the wavelength variation in the semiconductor laser.

However, this method also does not take into account the temperature-dependent variation in the refractive index of the collimator lens or its thermal expansion and, hence, is not an ideal means for achieving satisfactory correction for potential temperature changes. In addition, none of the three prior art techniques described above provide an effective solution to the problems involved in the correction of optics, such as the aforementioned scanning optics equipped with "tilt correcting" optics, that experience different amounts of temperature-dependent changes in imaging characteristics in the main and sub-scanning directions. There have been no prior art methods that take into account two types of deviation of the image plane from the surface to be scanned, one being due to curvature of the field and astigmatism and the other being the deviation on account of temperature variations.

SUMMARY OF THE INVENTION

The present invention has been accomplished under these circumstances and has as an object providing an optical scanner that takes into account all of the factors listed below and which optimizes the optics such that the movements of the image plane due to those factors are canceled by one another or that the sum of these movements is either minimized or reduced to a practically acceptable small value, thereby ensuring that the scanner will exhibit consistent imaging performance irrespective of the variations in the ambient temperature:

a. the change in lens geometry due to the temperature-dependent expansion (or contraction) of an individual lens;

b. the temperature-dependent variation in the position of an individual lens, particularly, in the distance from the collimator lens to the light source;

c. the temperature-dependent changes in a and b that occur in the main and sub-scanning directions in which different optical characteristics are observed with respect to the optical axis; and d. the movement of the image plane at different angles of deflection in the presence of astigmatism and field of the curvature Which are inherent in the scanning optics of interest.

All of these factors need not necessarily be calculated but shall be taken into consideration if they are held to be necessary on the basis of the evaluation of their effect.

Means for Solving the Problems:

The above-stated object of the invention can be attained by an optical scanner according to the first aspect of the invention, which comprises a light source, first optics with which a light beam emitted from said light source is transformed to have specified characteristics, a deflector for deflecting the light beam issuing from said first optics, and second optics with which the light beam as deflected with said deflector is focused to form an image on a predetermined surface to be scanned, characterized in that considering both a main scanning cross section which is swept by the light beam as deflected with said deflector and a sub-scanning cross section which is orthogonal to said main scanning cross section and which includes the optical axes of said first and second optics, the cross section in which the image plane makes the greater amount of axial movement in absolute terms due to the change in the distance from said light source to the first optical element of said first optics is the same as the cross section in which the image plane makes the greater amount of axial movement in absolute terms due to the temperature-dependent changes in the optical characteristics of said first and second optics.

The object can also be attained by an optical scanner according to the second aspect of the invention, which comprises a light source, first optics with which a light beam emitted from said light source is transformed to have specified characteristics, a deflector for deflecting the light beam issuing from said first optics, and second optics with which the light beam as deflected with said deflector is focused to form an image on a predetermined surface to be scanned, characterized in that considering both a main scanning cross section which is swept by the light beam as deflected with said deflector and a sub-scanning cross section which is orthogonal to said main scanning cross section and which includes the optical axes of said first and second optics, the cross section in which the image plane makes the greater amount of axial movement in absolute terms due to a temperature change differs from the cross section in which said second optics experiences the greater curvature of the field.

In each of the optical scanners according to the first and aspect, at least one of the optical elements of the second optics is made of a plastic material. If desired, the optical scanner of the second aspect may be so adapted that the axial position of the mean value through the curvature of the field of the second optics in a main scanning cross section is in substantial coincidence with the axial position of the main valve through the curvature of the field of the second optics in a sub-scanning cross section.

In the first aspect of the invention, the absolute amount of the movement of the image plane due to the temperature-dependent changes of optical characteristics is greater in either one of the main and sub-scanning cross sections than in the other cross section. To compensate for this difference, the cross section in which the image plane makes the greater amount of movement in absolute terms due to the temperature-dependent change in the distance from the light source to the collimator lens is adapted to be the same as the cross section in which the image plane makes the greater amount of movement in absolute terms due to the temperature-dependent changes in the optical characteristics. In addition, the first mentioned movement of the image plane is allowed to occur in opposite direction to the second mentioned movement of the image plane, whereby the overall movement of the image plane due to temperature variations is reduced to a minimum.

The second aspect of the invention is based on the compensation by the above-described first aspect; the cross section involving the greater amount of the residual movement of the image plane is adapted to be the same as the cross section involving the smaller curvature of the field in the scanning optics, whereby the overall displacement of the image plane relative to the surface to be scanned including the one caused by temperature variations is reduced to a minimum.

DESCRIPTION OF THE PREFERRED EMBODIMENTS

Figure 1:
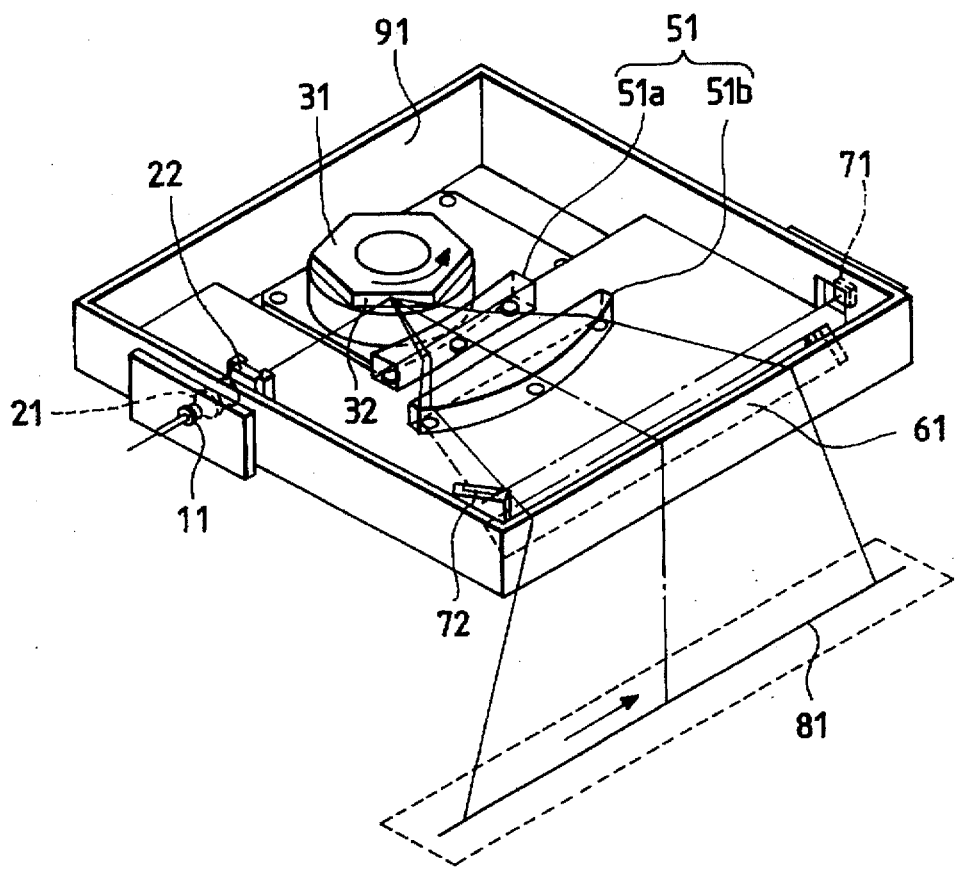
FIG. 1 is a perspective view showing the construct of an optical scanner according to the first or third example of the invention.
Figure 2:
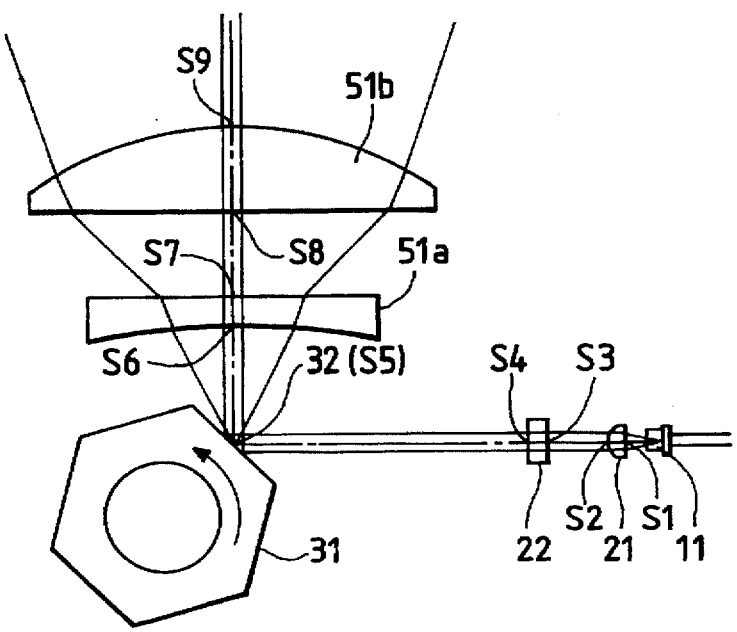
FIG. 2 is a main scanning cross section of the optics used in the first and third examples of the invention.
Figure 3:
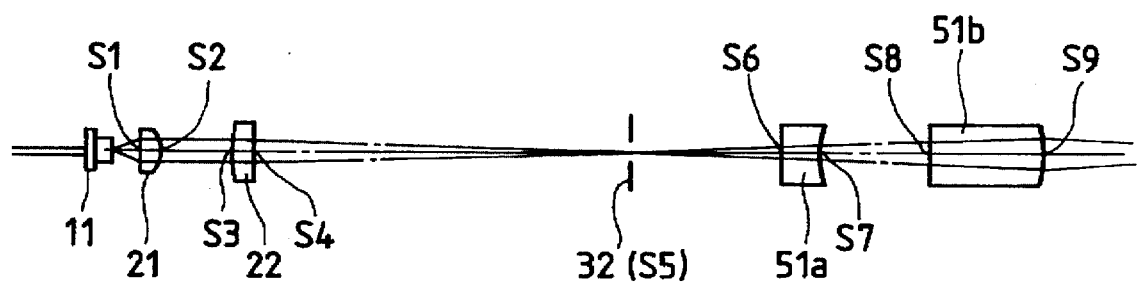
FIG. 3 is a sub-scanning cross section of the optics used in the first and third examples of the invention.

Four examples of the invention will now be described with reference to accompanying drawings. FIG. 1 is a perspective view of an optical scanner according to the first example of the first as invention; FIG. 2 shows a main scanning cross section of the optics used in the optical scanner; and FIG. 3 shows a sub-scanning cross section of the optics which includes the optical axis and which is orthogonal to the main scanning cross section. As shown, a laser beam emitted from a semiconductor laser 11 is shaped by passage through a collimator lens 21 to have such a cross section that it provides generally parallel light. The beam thus shaped is passed through a cylindrical lens 22 and focused so as to form a line image on a deflecting surface 32 of a rotating polygonal mirror 31 in a direction parallel to the scanning direction. The beam deflected from the rotating polygonal mirror 31 is made convergent by passage through scanning lenses 51. The deflected convergent beam is reflected by a bending mirror 61 such that the direction of its travel is changed, thereby forming a focused spot of a specified size on the surface to be scanned 81. The scanning lens 51 has an f$\theta$ characteristic as already described in connection with the prior art.

Prior to the scanning of the surface 81, the deflected beam is reflected by a synchronous detecting mirror 72 and launched into a synchronous detector 71 to generate the sync signal necessary to perform signal processing for each scan. The components described above are fixed on an optical base 91 which is resin molded in one piece. The scanning lenses 51 are composed of two lens elements 51a and 51b. Lens element 51a is formed of optical glass but lens element 51b is formed of a plastic material since the toric surface S9. (see FIGS. 2 and 3) from which the deflected beam emerges can be fabricated from plastics more easily than glass.

A specific data sheet for the optics composed of the lens surfaces S1–S9 is given below in Table 1 in terms of the axial distance between lens surfaces (d), paraaxial radius (R) and refractive index (n). Symbol $\underline{x}$ in parentheses represents the paraaxial radius in a sub-scanning cross section and symbol $\underline{y}$ in parentheses represents the paraaxial radius in a main scanning cross section.

TABLE 1

| Surface No. | Paraaxial radius, R | Axial distance between surfaces, d | Refractive index, n |
| --- | --- | --- | --- |
| 0 | - (light source) | 4.758 | 1.0000 |
| S1 | ∞ | 2.5 | 1.675 |
| S2 | 4.2189 | 10 | 1.0000 |
|  | k = −0.8596 |  |  |
|  | A = −0.4769 × 10$^{-3}$ |  |  |
|  | B = −0.2991 × 10$^{-5}$ |  |  |
|  | C = 0.9757 × 10$^{-7}$ |  |  |
|  | D = 0.2824 × 10$^{-17}$ |  |  |
| S3 | 26.25 (x) | 3 | 1.5112 |
|  | ∞ (y) |  |  |
| S4 | ∞ | 50 | 1.0000 |
| S5 | ∞ | 20 | 1.0000 |
|  | (reflecting face) |  |  |
| S6 | −123.23 | 5 | 1.5112 |
| S7 | 13.523 (x) | 14.266 | 1.0000 |
|  | ∞ (y) |  |  |
| S8 | 1859.9 | 15 | 1.4862 |
| S9 | −15.28 (x) |  |  |
|  | −60.96 (y) |  |  |
|  |  | 219 | 1.000 |

The angle of divergence of the laser beam emitted from the semiconductor laser 11 is about 10 degrees in a plane parallel to the junction plane in the semiconductor device and increases to as many as 30–40 degrees in a plane vertical to the junction plane. Therefore, in order to insure that the beam is launched efficiently into a lens of small effective aperture, the collimator lens 21 is generally designed to have a focal length ranging from several millimeters up to about 20 mm. The angle of laser beam divergence under discussion is expressed in terms of total angle at half peak. Thus, the collimator lens 21 has the greatest optical power of the lenses employed in the optical scanner and, in order to ensure that the radius of its curvature is not unduly small, the collimator lens 21 is formed of an optical material having high refractive index.

In order to provide enhanced coupling efficiency to the semiconductor laser 11, the numerical aperture of the collimator lens 21 may be increased, but then the spherical aberrations that develop in the lens will influence the imaging performance. Under the circumstances, the surface of the collimator lens 21 is sometimes rendered aspheric rather than spherical. Since it is not economical to fabricate aspheric surfaces by polishing glass materials, glass molded lenses are often employed. In this case, too, glass materials of high refractive index are selected for index and moldability (softness) reasons. In the example under consideration, SF8 (a glass type of Schott Glaswerke in Germany; on the pages that follow, glass materials are identified by glass type of this company). The aspheric coefficient which provides an aspheric surface is defined below by equation (1). It should be noted here that for evaluation of the temperature-dependent changes in optical characteristics, calculation may be performed using the paraaxial radius:

$$Z = \frac{y^2}{R \cdot \left[1 + \sqrt{1 - (1+k) \cdot \frac{y^2}{R^2}}\right]} + A \cdot y^4 + B \cdot y^6 + C \cdot y^8 + D \cdot y^{10} + E \cdot y^{12} \quad (1)$$

where
Z: the surface position in an optical axis,
R: the paraxial radius of curvature, and
y: the distance from an optical axis.

Conventional optical glass materials will suffice for the cylindrical lens 22 to exhibit satisfactory characteristics and, hence, it is formed of the most common optical glass BK7. The scanning lens element 51a is also made of BK7. As already mentioned, the scanning lens element 51b is a plastic lens and formed of an acrylic resin (PMMA).

We now discuss the effects of temperature on the semiconductor laser and each of the lenses used in the optical scanner. Before going into details, let us first describe the temperature-dependent changes in the oscillation wavelength of the semiconductor laser 11. The length of the resonator in the semiconductor laser 11 is variable with temperature, so the oscillation wavelength of the laser is also variable with temperature. With the common GaAlAs semiconductor laser, the oscillation wavelength increases by 0.23–0.26 nm in response to a temperature increment of 1° C. This incremental increase in wavelength is expressed as $d\lambda/dT$. In the first example under consideration, a typical value of 0.25 (nm/°C.) is adopted as $d\lambda/dT$ in the performance of the following calculations.

On the other hand, the refractive index of the lens material is dependent on wavelength. The value 780 nm is used as the center value of the oscillation wavelength of the semiconductor laser 11. The wavelength-dependent change in refractive index (which is generally referred to as "dispersion") is expressed by the Abbe number but this is not suitable for describing the changes at wavelengths near 780 nm. To be exact, a dispersion formula expressed by a polynomial is used and specific wavelength values are substituted into the formula to determine the refractive index and the wavelength-dependent change in refractive index (which is hereunder expressed as $dn/d\lambda$). Generally speaking, refractive index decreases with increasing wavelength.

Therefore, the overall effect of wavelength variations on the semiconductor laser is expressed by:

$$dn'/dT = (dn/d\lambda) \cdot (d\lambda/dT) \quad (2)$$

which represents the change in refractive index for one degree Celsius. The designation "$dn'/dT$" is used to make distinction from the temperature-dependent variation in the refractive index of the lens material per se.

We next describe the relationship between the refractive index of the lens material and temperature. The refractive indices of optical materials are generally variable with temperature. Not only the lens material but also the surrounding air will experience a change in refractive index with temperature. Therefore, the rate of temperature-dependent change in refractive index (which is hereunder expressed as $dn/dT$) is referenced against the value for air at the same temperature. When temperature rises, the lens material will expand and its density will change, causing a variation in refractive index and this index variation is also included in $dn/dT$.

When temperature rises, the refractive index of a certain lens material will increase or decrease depending on the type of the lens material. Consider, for example, SFL6; the temperature-dependent variation in the refractive index of this glass material is ten times less than the index variation in other glass materials, say, BK7. Conversely, the acrylic resin (PMMA) used in the scanning lens element 51b experiences index variations that are at least ten times as great as what occur in other glass materials such as BK7. These glass materials have increased refractive indices when temperature rises. On the other hand, general plastic materials tend to have a lower refractive index when temperature rises.

Finally, we describe the temperature-dependent change in the volume of the lens material. Like ordinary engineering materials, the lens material also expands in volume when temperature rises. The rate of expansion may be expressed by a linear expansion coefficient β, which represents an incremental change in one-dimensional size for one degree Celsius. In the invention, not only the lenses but also other members such as the optical base 91 are included in the discussion of thermal expansion. The linear expansion coefficient is not much different among various grades of optical glass material but the linear expansion coefficient of plastic materials are almost ten times as great as the value for glass materials. Data on the wavelength-dependent change in refractive index ($dn'/d\lambda$), the temperature-dependent change in the refractive index of lens material ($dn/dT$) and the linear expansion coefficient (β) are collectively given in Table 2 for typical glass and plastic materials.

TABLE 2

| Material | λ-dependent refractive index change, dn'/dλ (×10⁻⁵) | Material-dependent refractive index change, dn/dT (×10⁻⁶) | Linear expansion coefficient, β (×10⁻⁶) |
|---|---|---|---|
| Glass material | | | |
| BK7 | −2.09 | 2.55 | 7.1 |
| SF8 | −4.69 | 6.11 | 8.2 |
| SFL6 | −6.51 | 0.18 | 9.0 |
| Plastic material | | | |
| acrylic resin | −2.6 | −110 | 70 |
| amorphous polyolefin | −2.24 | −110 | 70 |

Let us now discuss how much the image plane will move when the temperature of the overall optics rises by 1° C. in the first example of the first aspect of the invention which is shown in FIGS. 2 and 3. The index variations in the respective lens materials (dn/dT), the index variations due to dispersion and wavelength variation (dn'/dT), and lens expansion (β) make different amounts of contributions to the movement of the image plane. The respective contributions, as well as the amount of movement of the image plane calculated by summing those contributions are listed in Table 3, below, for each of the main and sub-scanning cross sections.

TABLE 3

| | Due to λ variation and dispersion | Due to refractive index variation | Due to lens expansion |
|---|---|---|---|
| Relative movements of the image plane per 1° C. in the main scanning cross section | | | |
| Collimator lens | 0.1004 | −0.0524 | 0.04 |
| Cylindrical lens | 0 | 0 | 0 |
| Scanning lens 1 | −0.0017 | 0.0008 | −0.0012 |
| Scanning lens 2 | 0.054 | 0.0916 | 0.0291 |
| Total | | | 0.2120 |
| Relative movements of the image plane per 1° C. in the sub-scanning cross section | | | |
| Collimator lens | 0.1511 | −0.0791 | 0.0603 |
| Cylindrical lens | 0.0075 | −0.0037 | 0.0053 |
| Scanning lens 1 | −0.0024 | 0.0011 | −0.0005 |
| Scanning lens 2 | 0.019 | 0.3219 | 0.0836 |
| Total | | | 0.5641 |

The data in Table 3 were obtained by calculation on the assumption that the individual lenses, the light source (semiconductor laser) or the surface to be scanned does not change their position even if temperature changes. A positive sign is used to indicate the direction in which the image plane departs from the light source. As one can see from Table 3, in the sub-scanning cross section the movements of the image plane due to the index variation of the optical material for the scanning lens element 51b are greater than those of the image plane due to the other factors.

Upon closer examination about collimator lens 21 of Table 3, one can see that compared to the movements of the image plane due to the index variation depending on the wavelength variation and the dispersion, the movements of the image plane due to the temperature-dependent variation in the refractive index of the lens material per se are about one half and in opposite direction.

The collimator lens 21 is made of glass but the movements of the image plane due to the expansion of the lens per se are almost comparable to the movements of the image plane due to the expansion of the scanning lens element 51b per se which is made of a plastic material. It is therefore clear that temperature-dependent expansion must also be taken into account for glass lenses if they have great optical power.

For the purpose of the present discussion, the movements of the image plane due to the above-described temperature-dependent variations in wavelength, material-dependent index variations and thermal expansion of the lens per se are collectively referred to as the "movement of the image plane due to the temperature-dependent changes in optical characteristics". As already mentioned in connection with the description of the prior art, there has been available no optical scanner that is corrected for the above-defined movement of the image plane by taking into account the three factors, in particular, the thermal expansion of glass lenses. The individual factors that affect the movement of the image plane are given due appreciation in the invention, which then proposes an effective method for correcting the temperature-dependent changes in optical characteristics.

As Table 3 shows, in the absence of any corrective means, the image plane would move by about 0.56 mm for a temperature rise of 1° C. within the sub-scanning cross section. Given a temperature difference corresponding to the range of 15° C. over which the optical scanner is to be used, the image plane would move by about 8.5 mm. A laser beam with constant-phase wavefronts may be characterized as a Gaussian beam whose diameter d at an axial distance z from the beam waist at which the beam diameter assumes the smallest value is expressed by the following equation (the beam diameter is defined as the diameter at which the intensity of a beam's cross section is $1/e^2$ of the peak intensity):

$$d^2 = d_0^2 + \frac{(4 \cdot \lambda \cdot z)^2}{(\pi \cdot d_0)^2} \tag{3}$$

where λ is wavelength and d0 is the beam diameter at the beam waist. In optics of the type used in the first example, the beam waist is positioned in substantial coincidence with the image point of geometrical optics.

According to equation (3), the diameter of a laser beam producing a spot size of 100 μm at the beam waist will increase up to 131 μm if the image plane moves by 8.5 mm on account of a temperature variation. If the variation in spot size is to be reduced by +20% to 120 μm, the permissible movement of the image plane will be 6.7 mm.

Similarly, given a temperature difference of 15° C., the image plane would move by about 3.2 mm within the main scanning cross section and this is smaller than the movement within the sub-scanning cross section. This is because, as already mentioned, the optics used in the example under consideration is such that the scanning lens element 51b, which has a dominant effect on temperature variations has a greater power in the sub-scanning cross section than in the main scanning cross section. Thus, anamorphic optics is, in most cases, such that the change in optical characteristics in response to a temperature variation also differs in two orthogonal cross sections including the optical axis. In other words, the amount of astigmatism will vary with temperature in anamorphic optics.

In order to correct the movements of the image plane that occur on account of the temperature-dependent variations in optical characteristics, the position of the image plane may be detected by some method and may be controlled by causing a small change in lens position or some other parameter. With this control, very high precision may be insured in bringing the position of the image plane into coincidence with the surface to be scanned but this can only be realized by employing a complicated and expensive configuration of optics.

To avoid this problem, the thermal expansion of the holders of the light source and lenses may be utilized and the distance from the light source to an individual lens may be changed so that the image plane will be moved to cancel its movement due to the aforementioned temperature-dependent changes in optical characteristics. However, with parts of ordinary engineering materials, the temperature-dependent linear expansion coefficients are roughly about $1 \times 10^{-4}$ and, hence, it is difficult to expand a certain part to such an extent that the scanning lenses can be displaced by a sufficiently large amount so that it is equal to the movement of the image plane per se. Of course, this is possible by providing mechanical enlargement means but it not only adds to the cost but also lowers reliability typically due to errors in the amount of displacement that are caused by friction and deformation. It then follows that a desirable approach is to select a lens that is situated in such a position that the slightest movement of the lens will cause a substantial movement of the image plane and then set the necessary amount of temperature-dependent lens movement.

In the optics used in the first example of the invention, the change in the distance from the light source (semiconductor laser 11) to the collimator lens 21 is more influential on the movement of the image plane than the changes in any other parts. Therefore, if one selects the appropriate materials for the parts coupling the light source 11 and the collimator lens 21, the movements of the image plane due to the temperature-dependent variations of optical characteristics can be reduced to less than the permissible levels without providing any special mechanism or control unit.

Excepting the change in the distance between the semiconductor laser 11 and the collimator lens 21, the movement of the image plane for one degree Celsius due to the thermal expansion of the other parts such as the optical base is calculated to be about 0.0001 mm in the main scanning cross section and 0.015 mm in the sub-scanning cross section. These values are by far smaller than the corresponding sums of the movements due to the factors listed in Table 3 and may safely be disregarded for practical purposes.

The foregoing calculation of the movements of lenses due to temperature variations assumed that the individual lenses are mounted on the optical base 91 at the entrance faces whereas the semiconductor laser 11 is fixed to the optical base 91 at the point of light emission.

Figure 4:
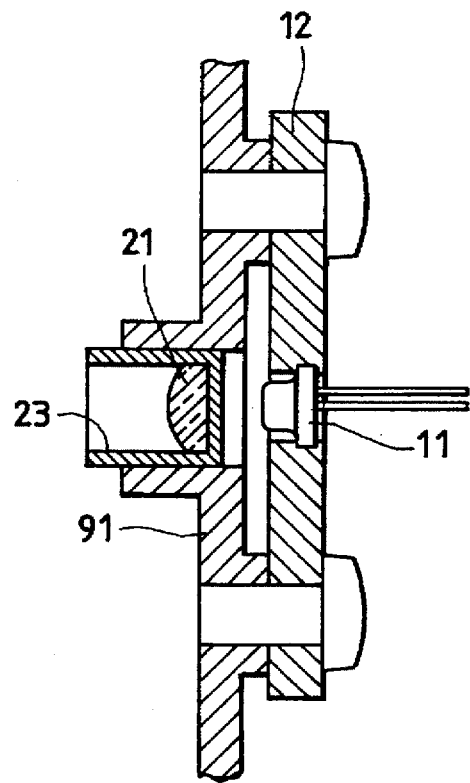
FIG. 4 shows details of the area around the collimator lens used in the first and third examples of the invention.

Details of the structure around the collimator lens in the optics of the first example are shown in FIG. 4. The semiconductor laser 11 is fitted in a LD holder 12 and the collimator lens 21 is mounted in a collimator lens barrel. The LD holder 12 is screwed to the optical base 91 whereas the collimator lens barrel 23 is fixed to the base 91 with an adhesive.

Let use describe specifically a first method for correcting the movements of the image plane in the main and sub-scanning cross sections that occur on account of temperature variations. The method comprises changing the distance between the semiconductor laser 11 and the collimator lens 21 by an amount that substantially cancels the movement of the image plane in the sub-scanning cross section. The amount to be determined is about 0.35 µm for one degree Celsius. A positive sign is used to indicate the direction in which the semiconductor laser 11 departs from the collimator lens 21. In the case of interest, the image plane moves by −0.15 mm in the main scanning cross section. Thus, in response to the 0.35-µm change in the distance between the semiconductor laser 11 and the collimator lens 21, the image plane moves by 0.36 mm in the main scanning cross section and by 0.56 mm in the sub-scanning cross section. In the optics under consideration, the image plane moves due to temperature-dependent changes in optical characteristics by a greater amount in the sub-scanning cross section than in the main scanning cross section and this is also true for the movement of the image plane that is realized by changing the distance between the semiconductor laser 11 and the collimator lens 21.

Thus, the cross section in which the image plane makes the greater amount of movement due to temperature-dependent changes in the optical characteristics of the individual lenses will benefit more from moving the light source (semiconductor laser 11) relative to the collimator lens 21. In order to ensure that the distance between the semiconductor 11 and the collimator lens 21 will experience a specified change with temperature, the structure and constituent materials of the relevant mechanical part may be selected in an appropriate manner such that the movements of the image plane due to temperature variations can be held to minimum levels for the optical scanner.

In this first method of correction, the distance from the semiconductor laser 11 to the collimator lens 21 is changed such that the movement of the image plane in the sub-scanning cross section due to a temperature variation is substantially canceled out. According to a second method of correction, the distance from the semiconductor laser 11 to the collimator lens 21 may be adjusted by such an amount as to cancel the movement of the image plane in the main scanning cross section. In this alternative case, the collimator lens 21 may be allowed to expand by 0.21 µm relative to the semiconductor laser 11 for one degree Celsius; this is sufficient to substantially cancel out the movement of the image plane that occurs in the main scanning cross section due to a temperature variation but, on the other hand, a movement of the image plane corresponding to 0.22 mm remains uncorrected in the sub-scanning cross section.

There is another method that can be adopted for the corrective purpose. According to this third method, the movement of the image plane is not completely corrected in either the main scanning or sub-scanning cross section and the absolute amounts of the residual movements are reduced. For example, if the distance from the semiconductor laser 11 to the collimator lens 21 is set to change by 0.29 µm for one degree Celsius (i.e., the collimator lens is allowed to expand by that amount relative to the semiconductor laser), the image plane will move by 0.09 mm toward the light source in the main scanning cross section but away from it in the sub-scanning cross section.

Thus, in any of the three corrective methods described above, the movement of the image plane for one degree Celsius can be reduced in both the main and sub-scanning cross sections compared to the case where no correction is made. Choice of the cross section where the correction should be made and determination of the upper limit for the amount of movement of the image plane entirely depend on that is which cross section, the main or sub-scanning cross section, higher resolution is required.

Specific application of various corrective methods to the first example of the invention will now be described. Since the distance from the light source (semiconductor laser 11) to the collimator lens 21 is about 4.76 mm, the linear thermal expansion coefficient that satisfies the operating conditions for the third corrective method is $0.00029/4.76 \cong 61 \times 10^{-6}$. If all components used between the light source and the collimator lens 21 have the same linear expansion coefficient, they may be formed of a material having the above-indicated value ($61 \times 10^{-6}$). This value is difficult to attain with metallic materials but it can be realized either with plastic materials containing no reinforcements or with glass-reinforced plastic materials that additionally contain reinforcement in a direction normal to the flow of fibers. Alternatively, the linear expansion coefficient of the collimator lens barrel 23 maybe adjusted to be smaller than those of the LD holder 12 and the optical base 91. If desired, the length of the collimator lens barrel 23 may be increased or other members may be interposed and these methods are equally effective in varying the distance between the semiconductor laser 11 and the collimator lens 21 in the manner described above.

Contrary to the first example,, the change in the distance from the light source to the collimator lens may cause the image plane to be moved by a greater amount in the main scanning cross section that in the sub-scanning cross section. If, in this case, the structure and the constituent materials of the components between the light source and the collimator lens are selected such as to cancel the movement of the image plane in the sub-scanning cross section due to temperature-dependent variations in optical characteristics, the position of the image plane in the main scanning cross section will experience a great departure from the surface to be scanned, which exceeds the amount of movement of the image plane that would occur in the sub-scanning cross section if no correction was made.

In order to get around this problem, the present invention sets the optics in such a way that the change in the distance between the light source and the collimator lens will allow the image plane to be moved by a greater amount in the sub-scanning cross section than in the main scanning cross section, thereby assuring more effective correction of the temperature-dependent variations in the position of the image plane. This means that the effectiveness of the correction is enhanced as the ratio of longitudinal magnification the optics from the light source to the point of image formation (or the surface to be scanned) within two orthogonal cross sections including the optical axis becomes closer to the ratio of movement of the image plane in the two cross sections due to temperature-dependent changes in lens characteristics (including wavelength variations).

In certain configurations of optics, the image of the light source may not be reimaged on the surface to be scanned but the beam waist will coincide with said surface. In a case like this, the image plane will not necessarily move by an amount that is equal to the change in the distance between the light source and the collimator lens multiplied by the longitudinal magnification. It is therefore necessary that the movement of the image plane in response to the change in the distance from the light source to the collimator lens should be determined for both the main and sub-scanning cross sections in consideration of the properties of the Gaussian beam.

In the first example under discussion, the cylindrical lens 22 is positioned behind the collimator lens 21. If the cylindrical lens 22 is axially moved by a small amount, there occurs little movement of the image plane within the main scanning cross section but, on the other hand, the position of the image plane can be moved within the sub-scanning cross section. Therefore, in addition to changing the distance between the light source 11 and the collimator lens 21, the cylindrical lens 22 may independently be moved in the axial direction in response to a temperature change and, in this case, too, the temperature-dependent variation in the position of the image plane can effectively be canceled out in both the main and sub-scanning cross sections by making compensation in terms of the main scanning cross section.

In the first example, this approach may be implemented with a mechanism in which the semiconductor laser 11 is allowed to move by 0.21 μm for one degree Celsius relative to the collimator lens 21 as in the second corrective method and in which the cylindrical lens 22 is allowed to move by 27 μm toward the light source for one degree Celsius. The condition stated in the preceding paragraph is satisfied and the image plane can at all times be brought into coincidence with the surface to be scanned in terms of both the main and sub-scanning cross sections.

This mechanism is necessary for optical scanners having a very high precision but it is too complicated in structure and too expensive to be used on personal use laser beam printers and other apparatus that do not require so much high precision. As already mentioned, the primary objective of the present invention is to provide an optical scanner that employs the low-cost and simple method of controlling only the change in the distance from the light source to the collimator lens and which yet insures fairly good imaging performance under varying temperature conditions.

The structural layout of the area around the semiconductor laser 11 and the collimator lens 21 which is shown in FIG. 4 is merely intended to illustrate the invention and its concept is applicable to any structure that allows the distance between the semiconductor laser 11 and the collimator lens 21 to change in the manner specified above in response to temperature variations.

The foregoing description of the first example is directed to the case where the image plane moves in response to a temperature variation by a greater amount is the sub-scanning cross section than in the main scanning cross section; however, depending on the configuration of the optics, the image plane will move by a greater amount in the main scanning cross section than in the sub-scanning cross section. In that case, the distance between the light source and the collimator lens may be changed such that the image plane will move by a greater amount in the main scanning cross section than in the sub-scanning cross section.

As described on the foregoing pages, the first aspect of the present invention offers the advantage that one needs only to select the appropriate linear expansion coefficient for the mechanical parts interposed between the light source and the collimator lens in order to insure that the movement of the image plane due to temperature variations is reduced to a level within a practically acceptable range for both the main and sub-scanning cross sections. The "practically acceptable range" depends on the range of temperatures over which the product is to be used and on the required resolution of the product; in the first example, the value of about 6.7 mm was selected.

Figure 5:
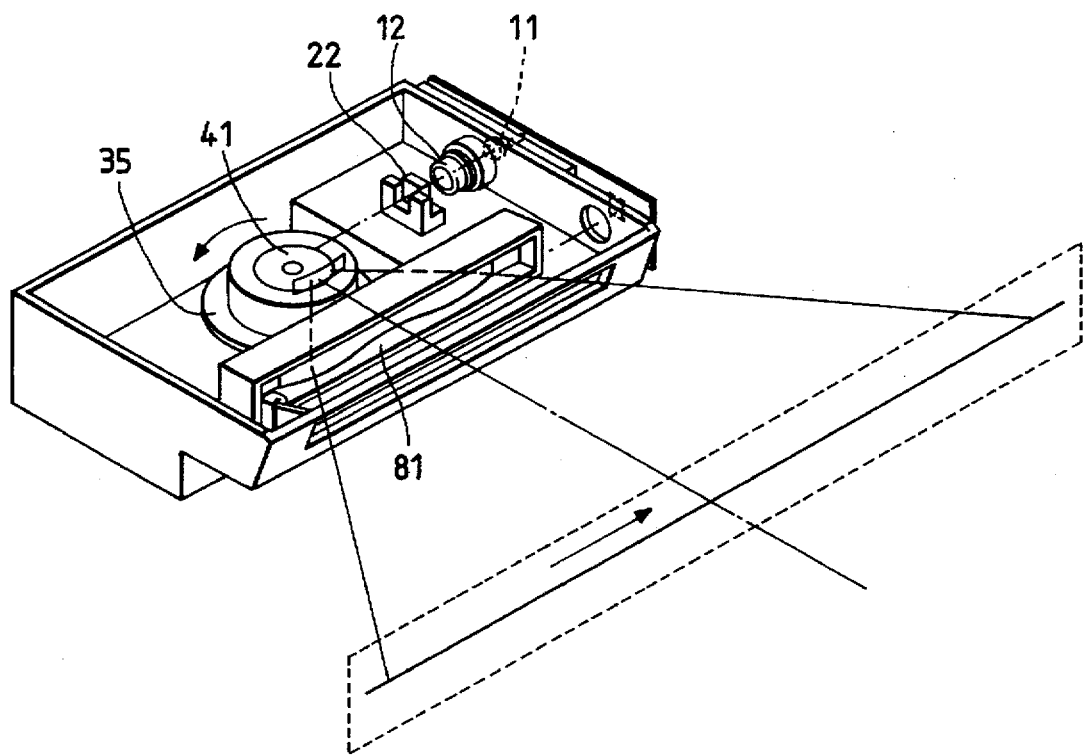
FIG. 5 is a perspective view showing the construction of an optical scanner according to the second or fourth example of the invention.
Figure 6:
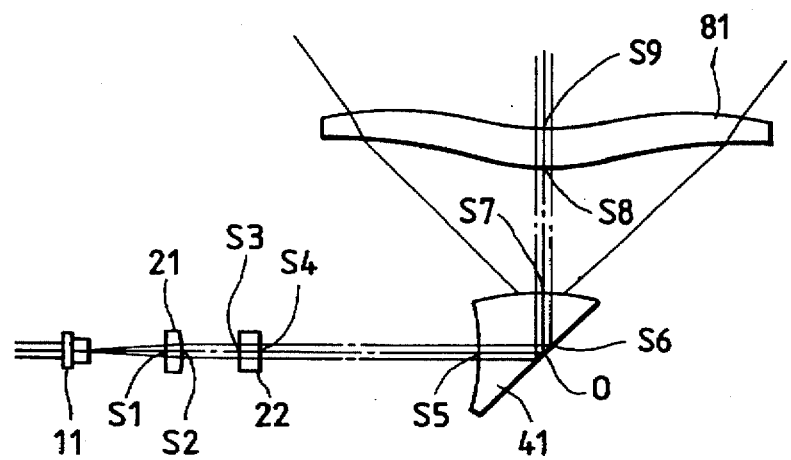
FIG. 6 is a main scanning cross section of the optics used in the second and fourth examples of the invention.
Figure 7:
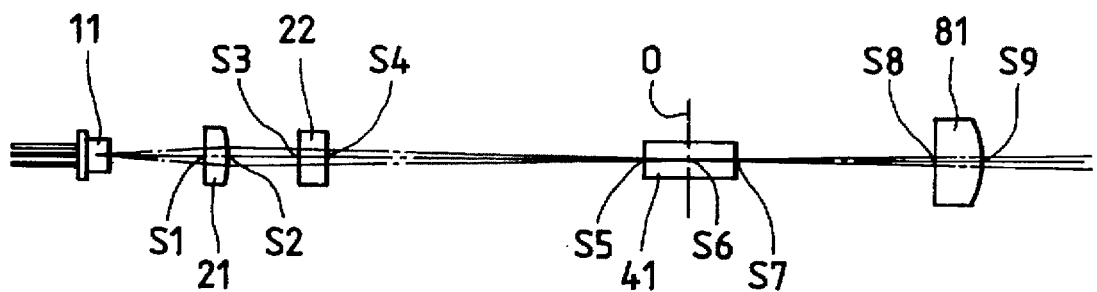
FIG. 7 is a sub-scanning cross section of the optics used in the second and fourth examples of the invention.

The second example of the first aspect of the invention will now be described with reference to FIGS. 5–7; FIG. 5 is a perspective view of an optical scanner according to the second example; FIG. 6 shows a main scanning cross section of the optics used in the scanner; and FIG. 7 shows a sub-scanning cross section of the optics which includes the optical axis and which is orthogonal to the main scanning cross section. As shown, a laser beam emitted from the semiconductor laser 11 is shaped by passage through the collimator lens 12 to have such a shape that it provides slightly convergent light. The thus shaped beam is passed through the cylindrical lens 22 and focused such as to form a line image on a reflecting surface S6 of a lens mirror 41 in a direction parallel to the scanning direction.

In the second example, the numerical aperture of the collimator lens 12 can be set at a comparatively small value, so it is designed as a spherical planoconvex lens made of the optical glass SFL6. The cylindrical lens 22 is made of BK7. The deflector unit is in the form of the lens mirror scanner that was already proposed by the assignee in Unexamined Published Japanese Patent Application (kokai) Hei 6-75162. The lens mirror 41 is mounted on the rotating part of a scanner motor 35 (see FIG. 5) and has three optical surfaces, entrance face S5, reflecting face S6 and exit face S7, as shown in FIG. 6, such that deflection is performed by internal reflection from the surfaces S6. The entrance face S5 and the exit face S7, when combined with the imaging lens 81 to be described below, perform two functions, scanning by a beam spot at uniform linear speed on the surface to be scanned and forming a planar image (to correct curvature of the field and astigmatism as optical characteristics) on that surface.

The lens mirror scanner typically provides the best optical characteristics when its rotating axis 0 is located in the reflecting face. Hence, scanner motor 35 may have two units of lens mirror 41 mounted in such a way that the reflecting face S6 of one unit is opposed to S6 of the other. The lens mirror 41 having this construction can be designed to have smaller outer dimensions than ordinary rotating polygonal mirrors and, hence, it is less subjected to the resistance of air (windage loss) due to rotation. In addition, the lens mirror has such a small secondary moment of inertia that it can attain high rotational speed in a short time, thereby reducing the time required for the scanner to perform its function after the scanner motor 35 has started to run.

Optical elements having a shape like that of lens mirror 41 can be molded of plastics in one piece and this is preferred from an economic viewpoint. In addition, due to the small density of plastics, the lens mirror 41 has a sufficiently small mass that it is less subjected to unbalancing effects due, for example, to the positioning error in the mounting operation. As a further advantage, the secondary moment of inertia of the lens mirror is small. Another advantage will result if the lens mirror is fabricated by injection molding of plastics; both entrance face S5 and exit face S7 can be provided with complex shapes other than spherical and cylindrical shapes at low cost and, hence, improved imaging performance can easily be attained. Alternatively, the face S5 and S7 may be cylindrical and, in this case, they can be produced by working in the same manner as with conventional cylindrical lenses and the manufacture is accomplished at a fairly low cost even if glass is used as the staring material and, yet, high surface precision is assured. Optical glass has the added advantage that materials having higher refractive indices than plastics can be employed and this enables the cylindrical surfaces to be provided with greater radii of curvature, thereby allowing a larger number of lens mirror units to be polished in one step and, hence, at an even lower cost. If desired, exit face S7 can be made planar or entrance face S5 convex-shaped; this provides greater ease in manufacture and achieves a further reduction in the unit price of each part. As a matter of fact, lens mirror 41 used in the optics of the second example is made of SFL6 which is ground to provide cylindrical surfaces.

With common rotating polygonal mirrors, one revolution performs scanning by the number of times that correspond to the number of reflecting surfaces (typically ranging from two to six). In contrast, the lens mirror scanner uses only two lens mirror units and provides a smaller number of scanning cycles per revolution. Hence, scanner motor 35 has to be run at a correspondingly increased speed. However, as already mentioned, the lens mirror scanner has a small moment of inertia and is subjected to smaller windage loss and balancing effects and the stated disadvantage of realizing only a small number of scanning cycles can be more than offset. The lens mirror 41 is preceded by an element of negative optical power that is positioned ahead of reflecting face S6, and, hence, the deflecting angular velocity of the beam issuing from the exit face S7 tends to be fast near the center of the scanning range but slow in its peripheral region. This characteristic is preferred since the beam spot focused on the surface to be scanned will move at a uniform linear speed. On the other hand, the beam incident on the rotating polygonal mirror is deflected at a uniform angular velocity.

The beam deflected from the lens mirror 41 is then incident on the imaging lens 81 as shown in FIG. 6. As already mentioned, the angular velocity of the beam deflected from the lens mirror 41 is not uniform but tends to decrease toward either end of the scanning range. Therefore, the imaging lens 81 does not have the same characteristics as in the scanner that uses a common rotating polygonal mirror as the deflector and no fθ action is provided. Hence, the imaging lens 81 does not have to satisfy both fθ and planar imaging characteristics unlike in the case of the prior art scanning lens and the latitude in lens design is increased accordingly.

When a plurality of deflecting surfaces are rotated to scan a light beam, it is generally the case that the angle of inclination from the rotating axis slightly differs from one deflecting surface to another due to several factors such as working errors. Hence, the scanning line the deflected beam draws on the surface to be scanned will be displaced in the sub-scanning direction according to the deflecting surface used. If image recording and reading are performed in this state, errors occur in the pitch of scanning lines, which is certainly undesirable for precise image recording and reading. To avoid this difficulty, the optics may be designed such that when it is seen in the sub-scanning cross section, each deflecting surface and the surface to be scanned either satisfy an optically conjugative relationship or assume a state that can be approximated by that relationship and this is effective in correcting the angular displacement of the beam that is caused in the sub-scanning direction on account of the tilting error in deflecting surfaces.

In the second example under discussion, the entrance face S8 of the imaging lens 81 is aspheric (non-arcuate), with high-order aspheric coefficients, in the main scanning cross section but linear in the sub-scanning cross section. The exit face S9 of the imaging lens 81 is also aspheric (non-arcuate), with high-order aspheric coefficients, in the main scanning cross section, but it is part of a convexo-arc, with the curvature varying progressively in the sub-scanning cross section as the distance from the optical axis increases. The curvature of the exit face S9 in the sub-scanning cross section is defined by the following equation, which means that the exit surface S9 is planoconvex in the sub-scanning cross section, with the convex surface directed toward the image plane:

$$Rx(y) = Rx + Ax \cdot y^2 + Bx \cdot y^4 + Cx \cdot y^6 + Dx \cdot y^8 + Ex \cdot y^{10} \quad (4)$$

where

Rx: the paraxial radius of curvature in sub scanning cross section, y: the distance from an optical axis, and $R_x(y)$: the radius of curvature in sub-scanning cross section at distance y.

$R_x = -11.0936$
$A_x = -2.4465^{-2}$
$B_x = 5.5392^{-3}$
$C_x = -8.6276^{-8}$
$D_x = 7.7486^{-11}$
$E_x = -2.7384^{-14}$

As already pointed out, the imaging lens 81 of this shape is difficult to fabricate from glass and is usually made from plastics. In the example under consideration, the imaging lens 81 is made from amorphous polyolefinic resins as exemplified by "ZEONEX" which is a trademark of Nippon Zeon Co., Ltd. Compared to the acrylic resin (PMMA) used in the already described first example of the invention, the amorphous polyolefinic resin experiences little variation in refractive index or shape with humidity (due to moisture absorption) and, hence, it is suitable for use in high-precision optics. The specific values of the axial distance between lens surfaces (d), paraaxial radius (R) and refractive index (n) for individual lenses are listed in Table 4 below. Symbol $\underline{x}$ in parentheses represents the paraaxial radius in the sub-scanning cross section and symbol $\underline{y}$ in parentheses represents the paraaxial radius in the main scanning cross section. The curvature of the exit face of the imaging lens 81 in the sub-scanning cross section varies according to equation (4).

TABLE 4

| Surface No. | Paraaxial radius, R | Axial distance between surfaces, d | Refractive index, n |
|---|---|---|---|
| 0 | - (light source) | 11.579 | 1.0000 |
| S1 | ∞ | 2.8 | 1.7856 |
| S2 | −9.748 | 8 | 1.0000 |
| S3 | 36.02 (x) | | |
| | | 3 | 1.7856 |
| | ∞ (y) | | |
| S4 | ∞ | | |
| | | 31 | 1.0000 |
| S5 | ∞ (x) | | |
| | | 9 | 1.7856 |
| | 32.41 (y) | | |
| S6 | ∞ | | |
| | (reflecting face) | | |
| | | 9 | 1.7856 |
| S7 | ∞ (x) | | |
| | | 18 | 1.0000 |
| | 39.22 (y) | | |
| S8 | ∞ (x) | | |
| | 28.253 (y) | | |
| | k = −1 | | |
| | A = −4.1423 × 10$^{-5}$ | | |
| | B = 7.1621 × 10$^{-8}$ | | |
| | C = −8.4567 × 10$^{-11}$ | | |
| | D = 5.7009 × 10$^{-14}$ | | |
| | E = −1.6817 × 10$^{-17}$ | | |
| S9 | −11.0936 (x) | | |
| | | 107.5 | 1.0000 |
| | 32.639 (y) | | |
| | k = −1 | | |
| | A = −3.6882 × 10$^{-5}$ | | |
| | B = 5.611 × 10$^{-8}$ | | |
| | C = −6.0091 × 10$^{-11}$ | | |
| | D = 3.6916 × 10$^{-14}$ | | |
| | E = −1.0085 × 10$^{-17}$ | | |

Let us now discuss how much the image plane will move when the temperature of the overall optics rises by 1° C. in the second example of the first aspect of the invention which is shown in FIGS. 6 and 7. The index variations in the respective lens materials (dn/dT), the index variations due to dispersion and wavelength variations (dn'/dT) and lens expansion (β) make different amounts of contributions to the movement of the image plane and the relative contributions of these factors, as well as the amount of movement of the image plane calculated by summing those contributions are listed in Table 5 below for each of the main and sub-scanning cross sections.

TABLE 5

| | Due to λ variation and dispersion | Due to index variation | Due to lens expansion |
|---|---|---|---|
| Relative movements of the image plane per 1° C. in the main scanning cross section | | | |
| Collimator lens | 0.0277 | −0.0003 | 0.0112 |
| Cylindrical lens | 0 | 0 | 0 |
| Lens mirror | 0.0006 | 0 | 0.0001 |
| Imaging lens | 0.0007 | 0.0129 | 0.0034 |
| Total | | 0.0563 | |
| Relative movements of the image plane per 1° C. in the sub-scanning cross section | | | |
| Collimator lens | 0.0397 | −0.0004 | 0.0161 |
| Cylindrical lens | 0.0102 | −0.0001 | 0.0047 |
| Lens mirror | −0.0015 | 0 | 0.0011 |
| Imaging lens | 0.0056 | 0.1107 | 0.0342 |
| Total | | 0.2203 | |

The data in Table 5 were obtained by calculation on the assumption that the individual lenses, the light source or the surface to be scanned does not change their position even if temperature changes. A positive sign is used to indicate the direction in which the image plane departs from the light source. As one can see from Table 5, the movement of the image plane due to the index variation of the constituent material of imaging lens 81 is greater in the sub-scanning cross section than those of the image plane due to the other factors. It is also clear that the other factors than the index variation of the lens material generally work to keep the image plane away from the light source.

Upon closer examination of Table 5, one can see that compared to the movements of tee image plane due to the index variation caused by the wavelength variation and the dispersion, the movements of the image plane due to the temperature-dependent variation in the refractive index of collimator lens 21 which is made of the glass SFL6 is very small. The movements of the image plane due to lens expansion is about one half and in the same direction as the movements of the image plane due to wavelength variations. As Table 5 shows, in the absence of any corrective means, the image plane would move by about 0.22 mm for a temperature rise of 1° C. within the sub-scanning cross section. Given a temperature difference corresponding to the range of 15° C. over which the optical scanner is to be used, the image plane would move by about 3.3 mm.

Similarly, given a temperature difference of 15° C., the image plane would move by about 0.8 mm within the main scanning cross section and this is smaller than the movement within the sub-scanning cross section. This is because, as already mentioned, the optics used in the second example under consideration is such that the imaging lens 81 which has a dominant effect on temperature variations has a greater power in the sub-scanning cross section than in the main scanning cross section.

As in the optics used in the first example, the change in the distance from the light source (semiconductor laser 11)

to the collimator lens 21 used in the optics of the second example is more influential on the movement of the image plane than the changes in any other parts. Therefore, if one selects the appropriate materials for the parts coupling the light source 11 and the collimator lens 21, the movements of the image plane due to the temperature-dependent variations of optical characteristics can be reduced to less than the permissible levels without providing any special mechanism or control unit.

Excepting the change in the distance between the semiconductor laser 11 and the collimator lens 21, the movements of the image plane for one degree Celsius due to the thermal expansion of the other parts such as the optical base are by far smaller than the sums of the movements due to the factors listed in Table 5 and may safely be disregarded for practical purposes.

Let us describe specifically the application of the first corrective method to the numerical data listed above. The method comprises changing the distance between the semiconductor laser 11 and the collimator lens 21 by an amount that substantially cancels the movements of the image plane in the sub-scanning cross section that occur on account of temperature variations. The amount to be determined is about 1.53 µm for one degree Celsius. A positive sign is used to indicate the direction in which the semiconductor laser 11 departs from the collimator lens 21. In the case of interest, the image plane moves by −0.1 mm in the main scanning cross section. Thus, in response to the 1.53-µm change in the distance between the semiconductor laser 11 and the collimator lens 21, the image plane moves by 0.15 mm in the main scanning cross section and by 0.22 mm in the sub-scanning cross section. In the optics under consideration, the image plane moves due to temperature-dependent changes in optical characteristics by a greater amount in the sub-scanning cross section than in the main scanning cross section and this is also true for the movement of the image plane that is realized by changing the distance between the light source and the collimator lens. Thus, the cross section in which the image plane makes the greater amount of movement due to temperature-dependent changes in the optical characteristics of an individual lens will benefit more from moving the light source relative to the collimator lens. In order to ensure that the distance between the light source and the collimator lens will experience a specified change with temperature, the structure and constituent materials of the relevant mechanical part may be selected in an appropriate manner such that the movements of the image plane due to temperature variations can be held to minimum levels for the optical scanner.

In this first method of correction, the distance from the light source to the collimator lens is changed such that the movement of the image plane in the sub-scanning cross section due to a temperature variation is substantially canceled out. According to the second method of correction, the distance from the light source to the collimator lens may be adjusted by such an amount as to cancel the movement of the image plane in the main scanning cross section. In this alternative case, the collimator lens may be allowed to expand by 0.56 µm relative to the semiconductor laser for one degree Celsius; this is sufficient to substantially cancel the movement of the image plane that occurs in the main scanning cross section due to a temperature variation but on the other hand, a movement of the image plane corresponding to 0.14 mm remains uncorrected in the sub-scanning cross section.

According to the third corrective method, the movement of the image plane is not completely corrected in either the main scanning or sub-scanning cross section and the absolute amounts of the residual movements are reduced. For example, if the distance from the light source to the collimator lens is set to change by 1.13 µm (i.e., the collimator lens is allowed to expand by that amount relative to the light source) for one degree Celsius, the image plane will move by 0.057 mm toward the light source in the main scanning cross section but away from it in the sub-scanning cross section.

In the second example under discussion, all parts interposed between the semiconductor laser 11 and the collimator lens 21 are made of a polycarbonate resin loaded with 50% glass. If this resin has a linear expansion coefficient of about $1.65\times10^{-5}$, the distance from the semiconductor laser 11 to the collimator lens 21 will change by about 0.19 µm for one degree Celsius. this is smaller than any of the values mentioned above in the explanation of the first to the third corrective method. Given this value, the image plane will move by 0.037 mm in the main scanning cross section and by 0.193 mm in the sub-scanning cross section for one degree Celsius; for the temperature range of 15° C. over which the optical scanner is to be used, the movement will increase to about 0.6 mm and 2.9 mm, respectively.

If the laser beam issued in the second example forms a spot having a beam waist of 70 µm in the main scanning cross section and if an increase of up to 30% is tolerated for the beam diameter due to the movement of the image plane under varying temperatures, the permissible movement of the image plane is calculated to be 4.1 mm. Thus, the movement of the image plane that occurs for one degree Celsius is less than the permissible value in both the main scanning and sub-scanning cross sections. In other words, there is no need to make as great corrections as in the first to the third corrective method described above and the construction around the collimator lens 21 can be significantly simplified. As a further advantage, all parts that separate the semiconductor laser from the collimator lens can be made of the same material and, hence, no distortion or coupling displacement due to linear expansion mismatch will occur at the joints of the respective parts, thereby making it possible to fabricate an optical scanner of high operational reliability. In addition, the linear expansion coefficient of $1.65\times10^{-5}$ is fairly close to those of metals, so the holders of the semiconductor laser 11 or collimator lens 21 may be made of metals and this is also advantageous from the viewpoints of heat dissipation and working precision.

Thus, according to the first aspect of the invention, the movement of the image plane due to temperature variations can be minimized in both the main and sub-scanning cross sections. If the optics permits fairly liberal movements of the image plane, comparatively small amounts of correction need be effected and this helps simplify the construction of the mechanical part that is subjected to the correction. The specific manner of the correction to be made depends on the field of application of the optical scanner and the resolution it requires. However, as already mentioned, the amount by which the movement of the image plane that occurs due to temperature variations is to be corrected can be set at a desired value in accordance with the first aspect of the invention; in addition, higher levels of correction can be accomplished in both the main and sub-scanning cross sections than has been possible without relying upon the first aspect of the invention.

In the first and second examples of the first aspect of the invention which have been described on the foregoing pages, the scanning optics includes plastic lenses which are subjected to substantial changes in refractive index with temperature or the changes in volume with temperature. However, even if the scanning optics is solely composed of glass lenses, its optical characteristics will change with temperature although not as much as in the case where plastic lenses are used; hence, with an optical scanner that requires a particularly high resolution, the same method as described hereinabove may be applied such that the movement of the image plane due to temperature changes is reduced.

In short, the first aspect of the invention is such that the final movements of the image plane are reduced to satisfactorily small value by insuring that the laser beam which is incident on the deflector or issuing from the collimator lens is changed with temperature in terms of its characteristic (e.g., the angle of divergence) and this is in sharp contrast with the prior art technique which is intended to ensure that the laser beam issuing from the collimator lens (or the laser unit) will have a constant characteristic under varying temperatures. In addition, the change in refractive index due to the wavelength variation in the semiconductor laser, the change in the refractive index of lens material, lens expansion and the temperature-dependent change in the distance to lens or light source are all taken into account in effecting the correction according to the first aspect of the invention and this is another point that distinguishes the invention from any of the prior art techniques that perform the correction on the basis of only some of the characteristics mentioned above.

The optical scanner according to the first aspect of the invention is suitable for use on small laser beam printers but this is not the sole case of the invention and it may of course be applied to image reading apparatus, as well as object detecting sensors and bar code scanners.

We now described the third example of the invention which relates to its second aspect. Using FIG. 2 which is a main scanning cross section of the optics used in the first example of the first aspect and FIG. 2 which is a sub-scanning cross section of the same optics that includes the optical axis and which is orthogonal to the main scanning cross section, we will discuss the relationship between the amount of field curvature and the movement of the image plane due to temperature changes. It is generally difficult with optical scanners to insure that the image plane coincides with the surface to be scanned 81 over the entire scanning range. This is because among the five Seidel aberrations, curvature of the field and astigmatism represent the movement of the image plane whereas distortion causes an error in linear speed (fθ error).

Complete correction of these aberrations is difficult to achieve and a certain mount of field curvature or astigmatism will remain in design. Even if this is possible in design, field curvature or astigmatism will occur on account of errors in lens manufacture or assembling of the optics. This means that the actual displacements of the surface to be scanned and the image plane consist of the movements of the image plane due to temperature variations which have been discussed above in connection with the first aspect of the invention, plus the above-mentioned curvature of the field or astigmatism. As noted before, the methods of correcting the temperature-dependent movements of the image plane according to the first aspect of the invention do not necessarily assure that those movements of the image plane can be completely corrected in both the main and sub-scanning cross sections. It is therefore necessary that the permissible movement of the image plane in each of the two orthogonal cross sections be distributed proportionately between the movement due to the temperature variation and the movement due to the field curvature or astigmatism.

Figure 8:
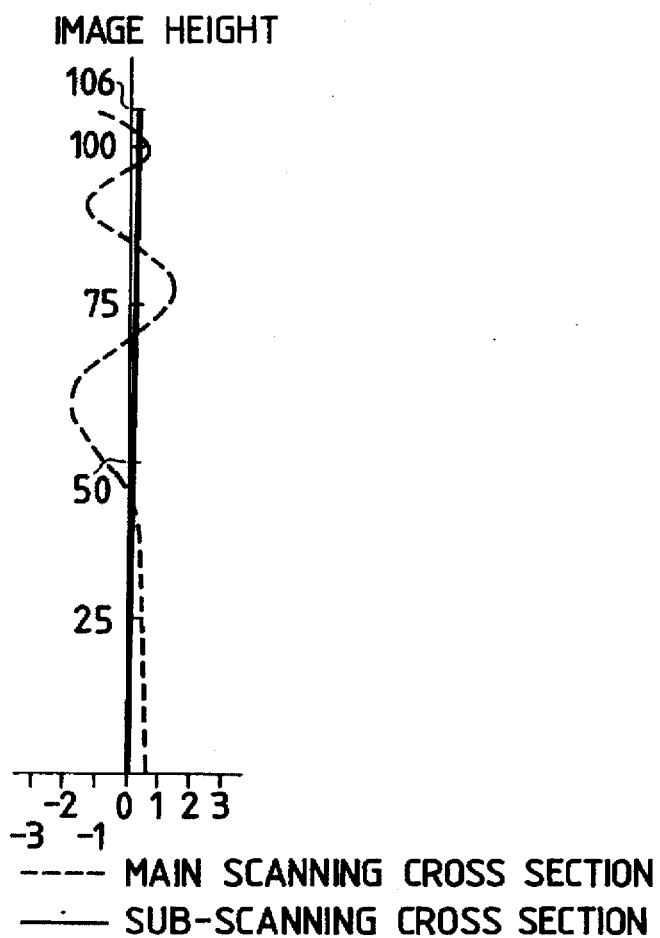
FIG. 8 is a graph plotting aberration curves obtained in the third example of the invention.

FIG. 8 is a graph plotting the aberration curves due to the curvature of the field and the astigmatism caused by the overall optics used in the third example of the invention. Obviously, the amount of field curvature is greater in the main scanning cross section (indicated by a dashed line) than in the sub-scanning cross section (indicated by a solid line). The image plan at the scan center (near the optical axis) has no coincidence between the main scanning and sub-scanning cross sections. If necessary, coincidence can be attained by adjusting the position of the cylindrical lens 22 in the manner already described above. However, the setting shown in FIG. 8 is intentional and the average error in the image plane is reduced by ensuring that the mean value of the range of field curvature in the sub-scanning cross section is brought into substantial coincidence with the mean value of the range of field curvature in the main scanning cross section at the central temperature of scanner's use.

The amount of field curvature is about 8.1 mm in the main scanning cross section and about 2 mm in the sub-scanning cross section. The difference of about 6.1 mm provides a corresponding allowance for the movement of the image plane due to temperature variations in the sub-scanning cross section.

If substantially the same amount of image plane displacement is permitted in each of the main and sub-scanning cross sections in the third example, a 0.23-μm change in the distance from the semiconductor laser 11 to the collimator lens 21 for one degree Celsius will cause the image plane to move by 0.05 mm in the main scanning cross section and by 0.19 mm in the sub-scanning cross section due to a temperature change of 1° C. The amount of movement of the image plane for 15° C. which are the range over which the optical scanner is to be used are 0.75 mm in main scanning cros section and 2.85 mm in sub-scanning cross section. Therefore, the sum of the amount of movement of the image plane due to temperature change and half the amount of field curvature mentioned in the preceding paragraph are 4.8 mm in main scanning cross section and 4.85 mm in sub-scanning cross section. Therefore, the position of the image plane will lie within substantially the same range for the main and sub-scanning cross sections.

We now describe the fourth example of the invention which also relates to its second aspect. Using FIG. 6 which is a main scanning cross section of the optics used in the second example of the first aspect and FIG. 7 which is a sub-scanning cross section of the same optics that includes the optical axis and which is orthogonal to the main scanning cross section, we will discuss the relationship between the amount of field curvature and the movement of the image plane due to temperature changes.

Figure 9:
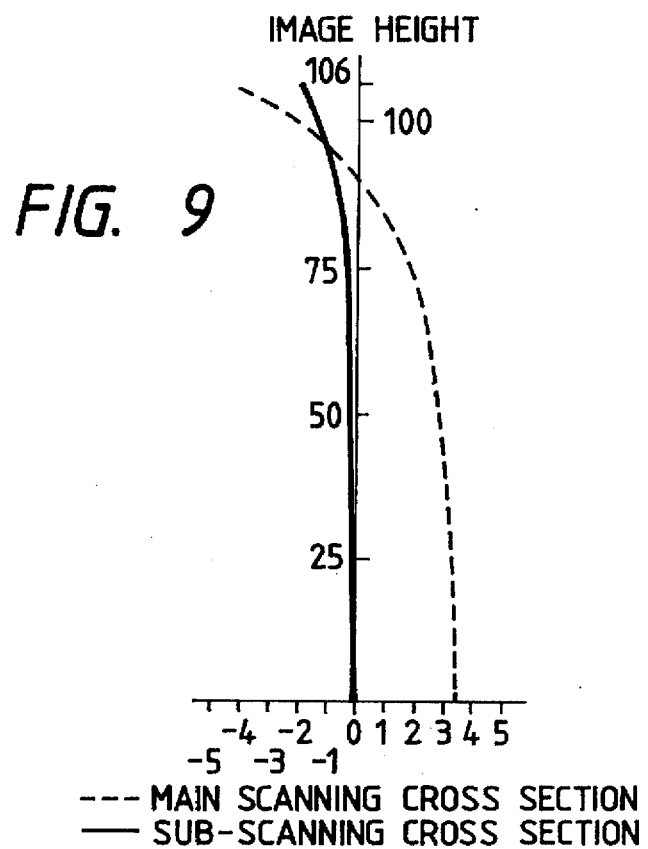
FIG. 9 is a graph plotting aberration curves obtained in the fourth example of the invention.
Figure 10:
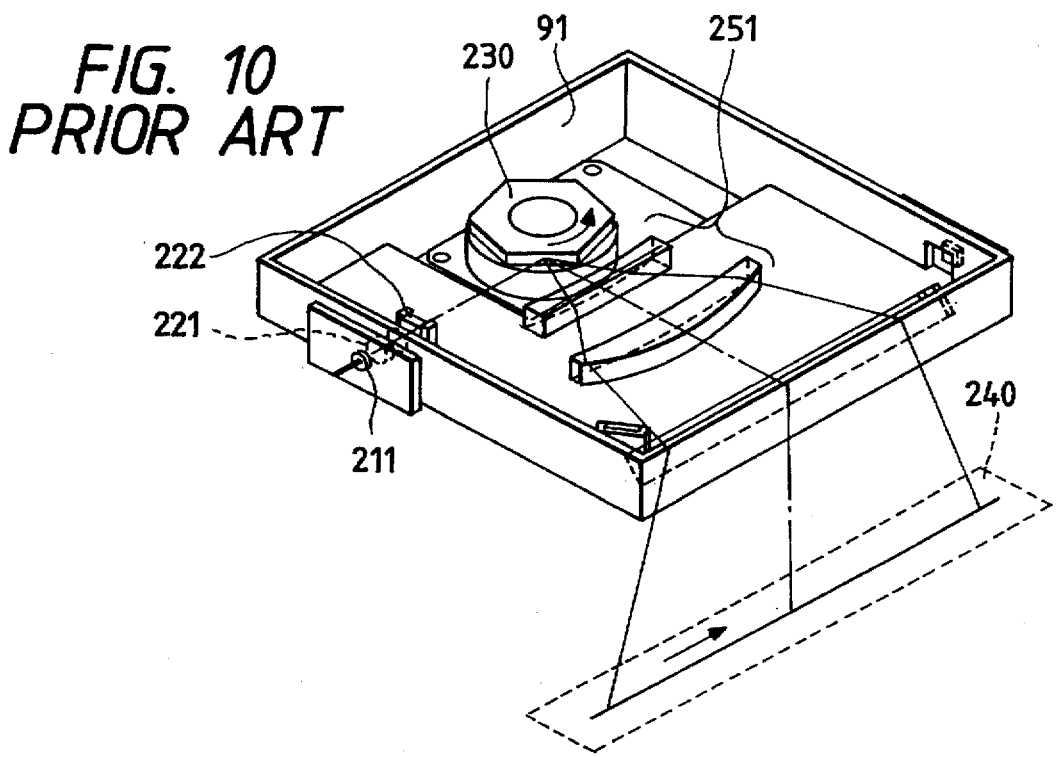
FIG. 10 is a perspective view showing the construction of a prior art optical scanner.

FIG. 9 is a graph plotting the aberration curves due to the curvature of the field and the astigmatism caused by the overall optics used in the second example of the invention.

The amount of field curvature is about 3.8 mm in the main scanning cross section (indicated by a dashed line) and about 0.2 mm in the sub-scanning cross section (indicated by a solid line). As in the third example, the amount of field curvature is greater in the main scanning cross section than in the sub-scanning cross section. In addition, for the same reason as given in the description of the third example, the image plane at the scan center (near the optical axis) has no coincidence between the main scanning and sub-scanning cross sections.

In the fourth example under discussion, all parts interposed between the semiconductor laser 11 and the collimator lens 21 are made of a polycarbonate resin with 50% glass. If this resin has a linear expansion coefficient of about $1.65 \times 10^{-5}$ the distance from the semiconductor laser 11 to the collimator lens 21 will change by about 0.19 μm for one degree Celsius. This is smaller than any of the values attained by the first to third corrective methods as applied in the second example. Given this value, the image plane will move by 0.037 mm in the main scanning cross section and by 0.193 mm in the sub-scanning cross section for one degree Celsius; for the temperature range of 15° C. over which the optical scanner is to be used, the movement will increase to about 0.6 mm and 2.9 mm, respectively.

If these values are added to the aforementioned amounts of field curvature, the results are about 2.5 mm (3.8/2+0.6) for the main scanning cross section and about 3 mm (0.2/2+2.9) for the sub-scanning cross section. If the laser beam issued in the fourth example forms a spot having a beam waist of 70 μm in the main scanning cross section and if an increase of up to 30% is tolerated for the beam diameter due to the movement of the image plane under varying temperatures, the permissible movement of the image plane is calculated to be 4.1 mm. Thus, the movement of the image plane that occurs for one degree Celsius is less than the permissible value in both the main and sub-scanning cross sections. In other words, there is no need to make as great corrections as in the first to the third corrective method described above and the construction around the collimator lens 21 can be significantly simplified. As a further advantage, all parts that separate the semiconductor laser from the collimator lens can be made of the same material and, hence, no distortion or coupling displacement due to thermal expansion mismatch will occur at the joints of the respective parts, thereby making it possible to fabricate an optical scanner of high operational reliability.

In addition, the linear expansion coefficient of $1.65 \times 10^{-5}$ is fairly close to those of metals, so the holders of the semiconductor laser 11 or collimator lens 21 may be made of metals and this provides a greater advantage from the viewpoints of heat dissipation and working precision.

Thus, according to the second aspect of the invention, the movement of the image plane due to temperature variations can be minimized in both the main and sub-scanning cross sections. If the optics permits fairly liberal movements of the imaging lens, comparatively small amounts of correction need be effected and this helps simplify the construction of the mechanical part that is subjected to the correction. The specific manner of the correction to be made depends on the field of application of the optical scanner and the resolution it requires. However, as already mentioned, the amount by which the movement of the image plane that occurs due to temperature variations is to be corrected can be set at a desired value in accordance with the second aspect of the invention; in addition, higher levels of correction can be accomplished in both the main and sub-scanning cross sections than has been possible without relying upon the second aspect of the invention. It should also be added that with its actual imaging characteristics, the optics used in the fourth example tends to permit a smaller movement of the image plane at both ends (in the peripheral region) of the scanning range in the main scanning cross section than in the area near the optical axis and, as already mentioned, the margin from the permissible level is preferably set to be greater in the main scanning cross section than in the sub-scanning cross section.

In the third and fourth examples of the invention which have been described on the foregoing pages, the scanning optics includes plastic lenses which are subjected to substantial changes in refractive index with temperature or the change in volume with temperature. However, even if the scanning optics is solely composed of glass lenses, its optical characteristics will change with temperature although not as much as in the case where plastics lenses are used; hence, with an optical scanner that requires particularly high resolution, the same technique as described hereinabove may be applied such that the movement of the image plane due to temperature changes is reduced.

Thus, according to the second aspect of the invention, a greater amount of movement can be tolerated by the image plane due to temperature variations for whichever of the two orthogonal scanning sections (main and sub-scanning cross sections) that experiences the smaller amount of field curvature or astigmatic errors in the image plane that are inherent in the design of the optics in the optical scanner or which occur on account of assembling or working errors. Stated in other words, the amount of field curvature that is tolerated by the scanning optics can be increased for the cross section that experiences the smaller movement of the image plane due to temperature variations and this enables lens manufacture by a less costly but more productive method. Thus, by making effective use of the deviation of the image plane from the surface to be scanned for each of the two orthogonal cross sections, satisfactory imaging characteristics can be assured over the full scanning range and at all temperatures in the operating range without demanding unduly high precision for the individual optical components or without performing highly precise assembling and adjusting operations.

Another feature of the second aspect of the invention is such that the final movements of the image plane are reduced to satisfactorily small values by insuring that the laser beam which is incident on the deflector or issuing from the collimator lens is changed with temperature in terms of its characteristics (e.g., the angle of divergence) and this is in sharp contrast with the prior art technique which is intended to ensure that the laser beam issuing from the collimator lens (or the laser unit) will have a constant characteristic under varying temperatures.

In addition, the change in refractive index due to the variation of the operating wavelength of the semiconductor laser, the change in the refractive index of lens material, lens expansion and the temperature-dependent change in the distance to lens or light or light source are all taken into account in effecting the correction according to the second aspect of the invention and this is another point that distinguishes the invention from any of the prior art techniques that perform the correction on the basis of only some of the characteristics mentioned above.

Advantages of the Invention:

As described on the foregoing pages, the optical scanner according to the first aspect of the invention is such that of the two orthogonal scanning cross sections of the scanning optics (i.e., the main and sub-scanning cross sections), the one that involves the greater movement of the image plane due to the changes in optical characteristics under varying temperatures is adapted to be the same as the other cross section that involves the greater movement of the image plane due to the change in the distance from the light source to the collimator lens. In addition, the scanner is designed such that the distance between the light source and the collimator lens will be changed appropriately with temperature. In this way, the movement of the image plane due to temperature changes is reduced in both the main and sub-scanning cross sections and the optical scanner which experiences less deterioration in imaging performance under varying temperatures can be fabricated using a simple structure and at a lower cost. This offers a particularly great benefit to scanning optics that employs plastic lenses since plastic materials will undergo greater amounts of temperature-dependent variations in optical characteristics, especially refractive index, than glass.

The optical scanner according to the second aspect of the invention parallels the optical scanner according to the first aspect in that of the two orthogonal scanning cross sections of the scanning optics (i.e., the main and sub-scanning cross sections), the one that involves the greater movement of the image plane due to the changes in optical characteristics under varying temperatures is adapted to be the same as the other cross section that involves the greater movement of the image plane due to the change in the distance from the light source to the collimator lens. In addition, the scanner is designed such that the distance between the light source and the collimator lens will be changed appropriately with temperature. In this way, the movement of the image plane due to temperature changes is reduced in both the main and sub-scanning cross sections and the optical scanner which experiences less deterioration in imaging performance under varying temperatures can be fabricated using a simple and at a lower cost. What is more, the main or sub-scanning cross section which involves the greater overall movement of the image plane after correction for temperature changes is adapted to be different from the sub-scanning or main scanning cross section which involves the greater amount of optical field curvature and this enables the fabrication of the optical scanner which has satisfactory overall imaging performance. If the mean value of the field curvature in the main scanning cross section is brought into coincidence with the mean value of the field curvature in the sub-scanning cross section, the margin or allowance for the movement of the image plane can be distributed in equal amounts in response to a positive or negative shift from the center of the operating temperature range and this enables the fabrication of an optical scanner that features higher operational stability under varying temperatures. As in the first aspect, this offers a particularly great benefit to scanning optics that employs plastic lenses since plastic materials will undergo greater amounts of temperature-dependent variations in optical characteristics, especially refractive index, than grass.

What we claim:

1. An optical scanner, comprising:

a light source for emitting a light beam, first optics, including a collimator lens, for providing a transformed light beam by transforming said light beam to have specified characteristics, a deflector for providing a deflected light beam by deflecting said transformed light beam in a main scanning direction, and second optics, including a scanning lens, for providing a focused light beam by focusing said deflected light beam to form a focused image on a predetermined surface to be scanned, said focused image defining an image point which has an image plane and cross sections, said cross sections including a main scanning cross section defined in said image plane in said main scanning direction, and a sub-scanning cross section defined in said image plane in a direction orthogonal to said main scanning direction;

wherein a first identified cross section is defined as one of said main scanning cross section and said sub-scanning cross section in which said image point makes a greater amount of axial movement, in absolute terms, due to a in change in distance from said light source to a first optical element of said first optics;

wherein a second identified cross section is defined as one of said main scanning cross section and said sub-scanning cross section in which said image point makes said greater amount of axial movement, in absolute terms, due to temperature-dependent changes in optical characteristics of said first optics and said second optics;

wherein said first identified cross section is the same cross section as said second identified cross section; and wherein said optical characteristics, for each of said first and said second optics, include:

wavelength-dependent refractive index variations resulting from variations in a wavelength of said light beam due to temperature, material-dependent refractive index variations due to temperature, and refractive power variations resulting from thermal expansion, including thermal expansion of said collimator lens.

2. An optical scanner according to claim 1, wherein at least one optical element of said second optics is made of a plastic material.

3. An optical scanner, comprising:

a light source for emitting a light beam, first optics, including a collimator lens, for providing a transformed light beam by transforming said light beam to have specified characteristics, a deflector for providing a deflected light beam by deflecting said transformed light beam in a main scanning direction, and second optics, including a scanning lens, for providing a focused light beam by focusing said deflected light beam to form a focused image on a predetermined surface to be scanned, said focused image defining an image point which has an image plane and cross sections, said cross sections including a main scanning cross section defined in said image plane in said main scanning direction, and a sub-scanning cross section defined in said image plane in a direction orthogonal to said main scanning direction;

wherein a first identified cross section is defined as one of said main scanning cross section and said sub-scanning cross section in which said image point makes a greater amount of axial movement, in absolute terms, due to a temperature change;

wherein a second identified cross section is defined as one of said main scanning cross section and said sub-scanning cross section in which said second optics experiences a greater field curvature due to said temperature change;

wherein said first identified cross section is not the same cross section as said second identified cross section.

4. An optical scanner according to claim 3, wherein at least one optical element of said second optics is made of a plastic material.

5. An optical scanner according to claim 3, wherein a respective axial position of a mean value through said field curvature of said second optics in a cross section corresponding to said main scanning direction is in substantial coincidence with a respective axial position of a center through said field curvature of said second optics in a cross section corresponding to said sub-scanning direction.

* * * * *